(12) United States Patent
Hudson

(10) Patent No.: US 11,160,249 B2
(45) Date of Patent: Nov. 2, 2021

(54) PET BOWL AND TETHER SYSTEM AND METHOD OF USE

(71) Applicant: Doil Collin Hudson, Anadarko, OK (US)

(72) Inventor: Doil Collin Hudson, Anadarko, OK (US)

( * ) Notice: Subject to any disclaimer, the term of this patent is extended or adjusted under 35 U.S.C. 154(b) by 431 days.

(21) Appl. No.: 16/258,644

(22) Filed: Jan. 27, 2019

(65) Prior Publication Data

US 2019/0230897 A1    Aug. 1, 2019

Related U.S. Application Data

(60) Provisional application No. 62/622,865, filed on Jan. 27, 2018.

(51) Int. Cl.
*A01K 1/04*    (2006.01)
*A01K 5/01*    (2006.01)
*A01K 7/00*    (2006.01)

(52) U.S. Cl.
CPC .............. *A01K 1/04* (2013.01); *A01K 5/0135* (2013.01); *A01K 7/005* (2013.01)

(58) Field of Classification Search
CPC ......... A01K 1/04; A01K 5/0135; A01K 7/005
USPC ....................................................... 119/786
See application file for complete search history.

(56) References Cited

U.S. PATENT DOCUMENTS

| | | | | |
|---|---|---|---|---|
| 2,484,263 A * | 10/1949 | Atkinson | ............. | A01K 1/04 |
| | | | | 119/61.57 |
| 2,671,460 A * | 3/1954 | Taseos | ............. | A45B 19/10 |
| | | | | 135/25.32 |
| 2,772,660 A * | 12/1956 | Saul | ............. | A01K 7/00 |
| | | | | 119/61.54 |
| 4,546,730 A * | 10/1985 | Holland | ............. | A01K 5/0114 |
| | | | | 119/61.57 |
| 5,148,626 A * | 9/1992 | Haake, Sr. | ............. | A01K 5/0142 |
| | | | | 119/61.53 |
| 5,339,847 A * | 8/1994 | Kanter | ............. | A45B 23/00 |
| | | | | 135/16 |
| 7,353,775 B1 * | 4/2008 | Stelmach | ............. | A01K 1/04 |
| | | | | 119/61.54 |
| 2004/0216697 A1 * | 11/2004 | Wojcik | ............. | A01K 1/04 |
| | | | | 119/786 |
| 2005/0011471 A1 * | 1/2005 | Laird | ............. | A01K 1/04 |
| | | | | 119/789 |
| 2006/0249089 A1 * | 11/2006 | Behunin | ............. | A01K 7/005 |
| | | | | 119/61.57 |
| 2009/0145371 A1 * | 6/2009 | Kramer | ............. | A01K 5/0114 |
| | | | | 119/787 |

(Continued)

OTHER PUBLICATIONS

"Taper", Merriam-Webster, retrieved from www.merriam-webster.com/dictionary/taper on May 26, 2021. (Year: 2021).*

*Primary Examiner* — Claude J Brown

(74) *Attorney, Agent, or Firm* — Leavitt Eldredge Law Firm

(57) ABSTRACT

A pet bowl and tether system includes a pet bowl, having a body with a top, a bottom, and one or more side walls forming a cavity for holding food or water; and a central elongated opening extending from the bottom to the top and positioned within a center of the cavity; a stake to extend through the central elongated opening and into a ground surface, the stake having a tethering device to tether a pet leash to.

3 Claims, 5 Drawing Sheets

(56) References Cited

U.S. PATENT DOCUMENTS

2013/0092088 A1* 4/2013 Sharp ............... A01K 5/01
  119/61.5
2014/0190419 A1* 7/2014 Harding ............ A01K 39/04
  119/51.5

* cited by examiner

PET BOWL AND TETHER SYSTEM AND METHOD OF USE

BACKGROUND

1. Field of the Invention

The present invention relates generally to pet bowl systems, and more specifically, to a pet bowl and tether system for ensuring a pet is tethered near to a bowl, wherein the bowl is protected from becoming overturned.

2. Description of Related Art

Pet bowls are well known in the art and are effective means to provide food and water to a pet. In addition, it is a common practice for pet owners to tether their pets to a stake or structure to prevent their pet from becoming lost.

One of the problems commonly associated with conventional pet bowls and tether systems is that pets can overturn their bowls or be tethered too far from their bowl, thereby causing them discomfort and placing them in a dangerous situation.

Accordingly, although great strides have been made in the area of pet bowl systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
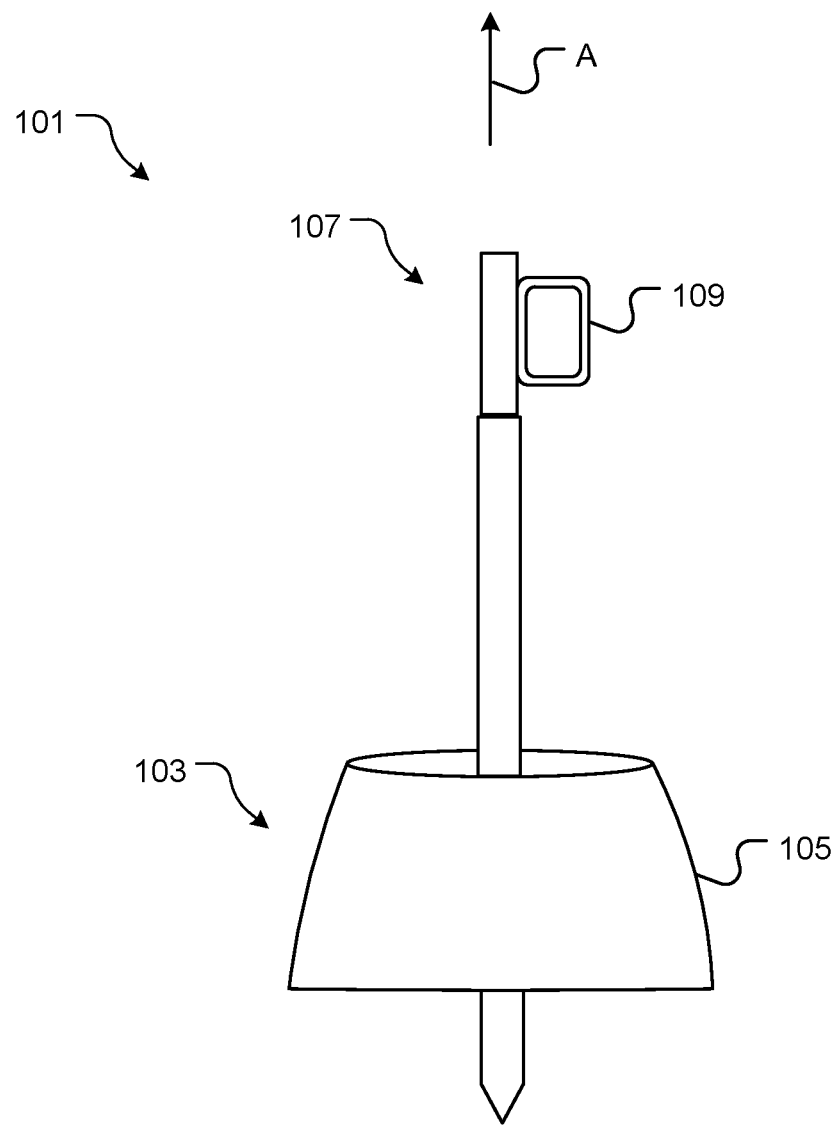
FIGS. 1A and 1B are front views of a pet bowl and tether system in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional pet bowl systems. Specifically, the present invention provides a means to tether a pet near a bowl while further preventing the bowl from becoming overturned. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 1B:
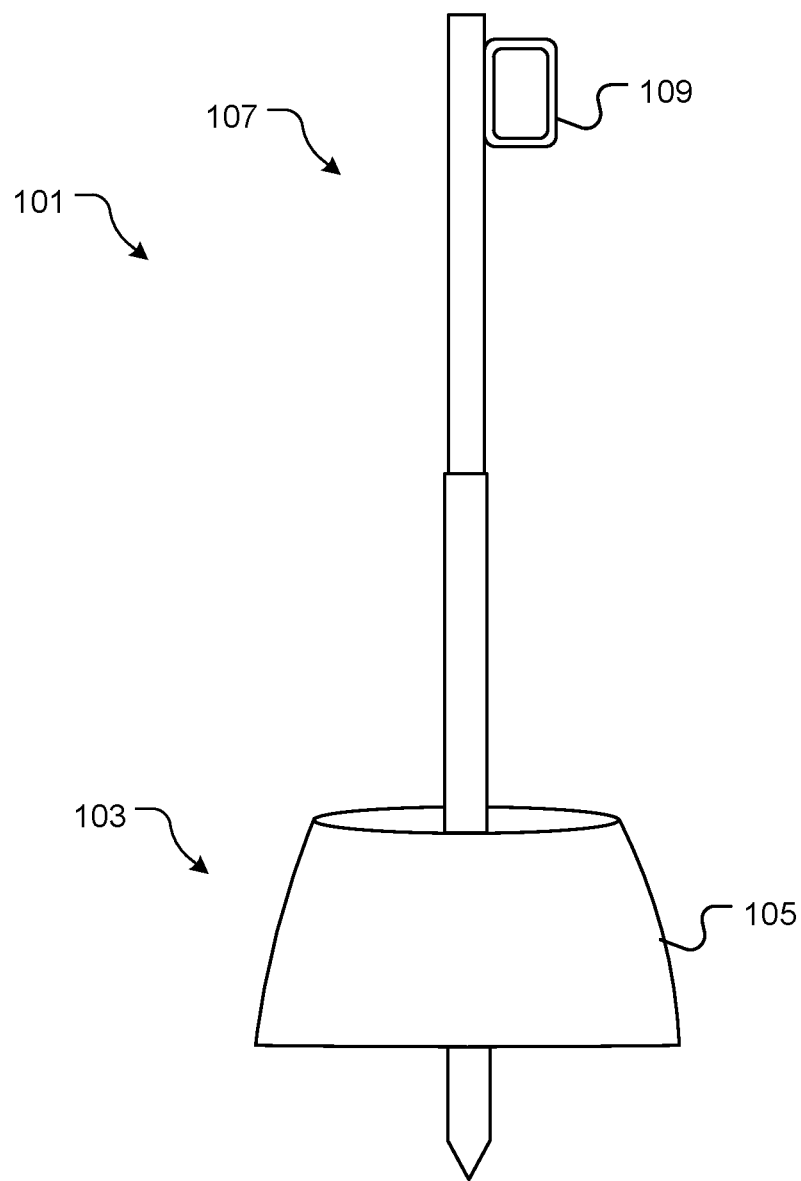

Referring now to the drawings wherein like reference characters identify corresponding or similar elements throughout the several views, FIGS. 1A and 1B depict front views of a pet bowl and tether system 101 in accordance with a preferred embodiment of the present application. It will be appreciated that system 101 overcomes one or more of the above-listed problems commonly associated with conventional pet bowl systems.

In the contemplated embodiment, system 101 includes a pet bowl 103 having a body 105 composed of a rigid material, such as stainless steel and having tapered sides 201 from a top 203 to a bottom 205, thereby making the bowl sturdy and stable as it rests on a ground surface. In addition, the tapered sides provide for improved safety, as this feature helps prevent a pet from placing their feet inside the bowl. It should further be appreciated that a variety of materials could be used, including metals, plastics, and the like for manufacturing bowl 103.

System 101 further includes a stake 107 configured to be inserted through an elongated opening 207 through a center of a cavity 209 of bowl 103. Stake 107 is to be inserted into the ground surface, thereby retaining the bowl in a desired location. Further, stake 107 and elongated opening 207 prevent bowl 103 from becoming overturned.

Stake 107 can further include a tether ring 109 allowing for securement of a pet leash, rope, or chain. In some embodiments, stake 107 can include a telescoping means (as shown with arrow A) thereby allowing for adjustment of the height of stake 107. Further, some embodiments of stake 107 can include a rotational/pivot means, thereby allowing for up to 360 degrees of rotation of the stake, ensuring that a pet does not become tangled and further has a wide range of motion.

Figure 2:
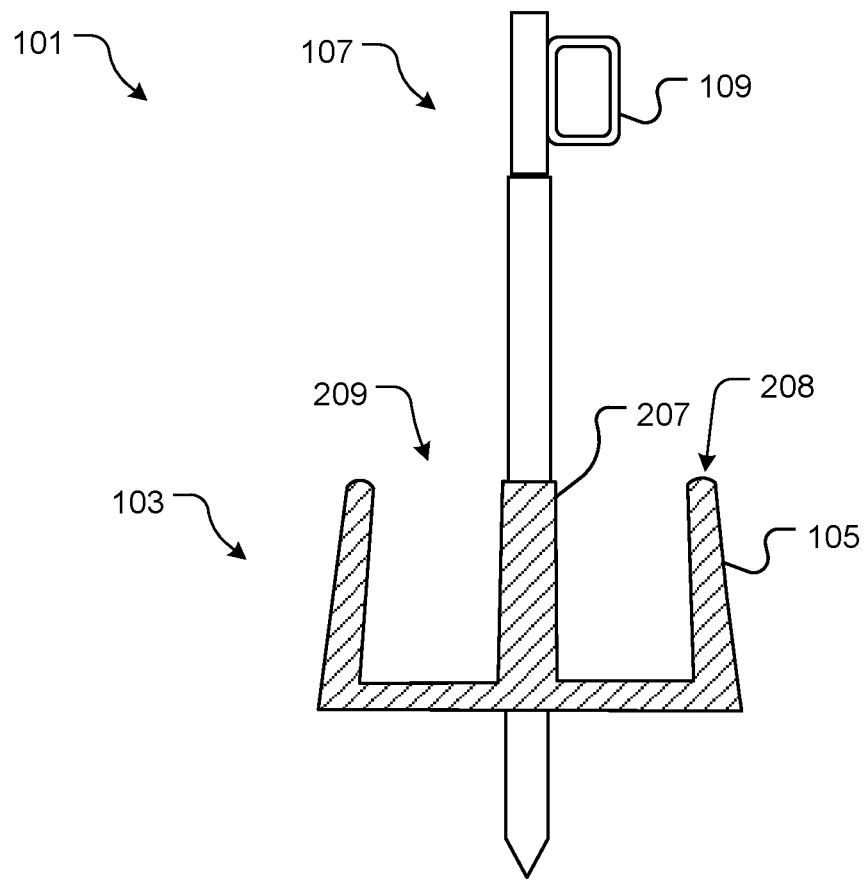
FIG. 2 is a cross sectional view of the pet bowl and tether system of FIGS. 1A and 1B.

In FIG. 2, a cross sectional view demonstrates the insertion of stake 107 into elongated opening 207 of bowl 103. As shown, a top rim 208 of bowl 103 is curved and smooth, thereby ensuring safety for the pet.

Figure 3:
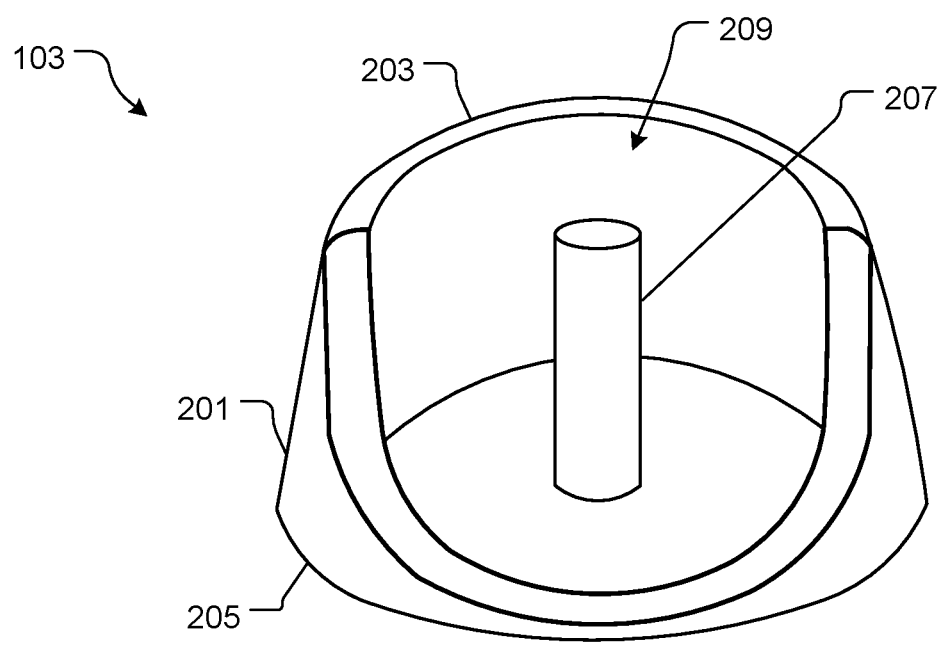
FIG. 3 is an oblique cross-sectional view of the pet bowl of FIGS. 1A and 1B.

In FIG. 3, an oblique cross-sectional view of bowl 103 is shown further demonstrating the tapered edges 201 and elongated opening 207 through which the stake is to be inserted.

Figure 4:
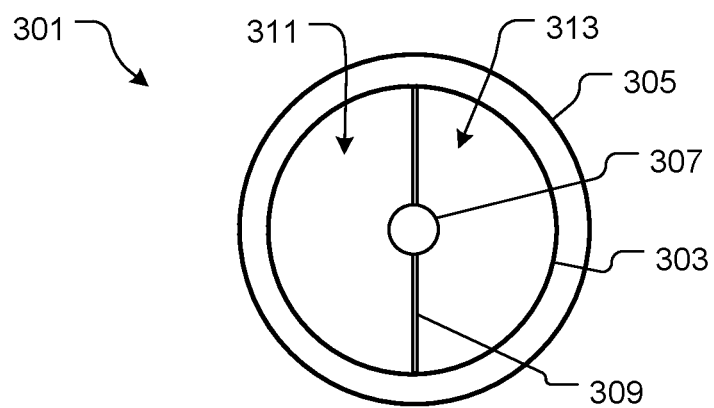
FIG. 4 is a top view of a pet bowl for use with the system of FIGS. 1A and 1B in accordance with an alternative embodiment of the present application.

In FIG. 4 a top view of a bowl 301 in accordance with an alternative embodiment of the present application is shown. It should be appreciated that bowl 301 includes all the features discussed above, including a top 303 and bottom 305 with tapered edges, forming a cavity with an elongated opening 307 extending therethrough. In this embodiment, a divider 309 is integrally incorporated into the cavity, thereby forming a first portion 311 and second portion 313. In this embodiment, the bowl 301 can be used for food and water at the same time.

It should be appreciated that one of the unique features believed characteristic of the present application is the elongated central opening configured to receive the stake therethrough, thereby providing a means to secure the bowl to a desired location.

Figure 5:
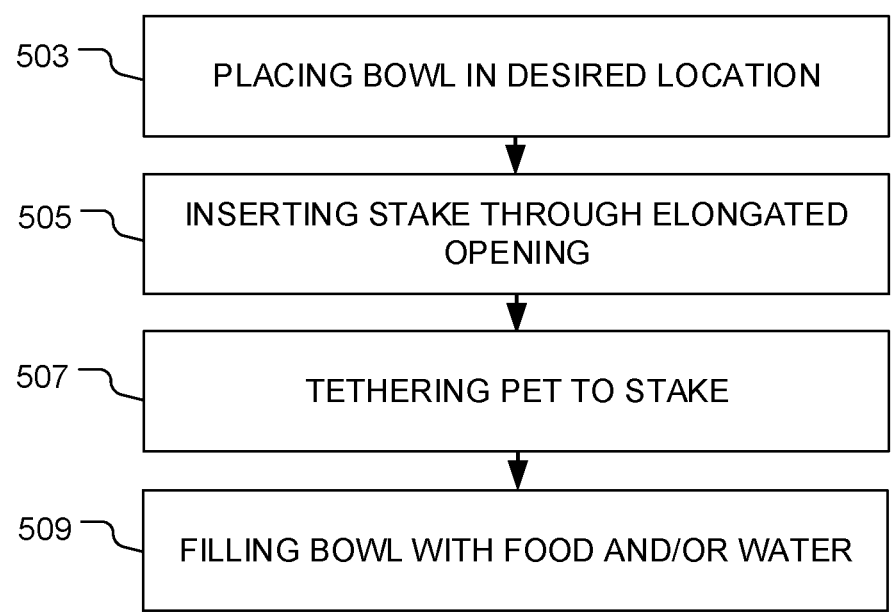
FIG. 5 is a flowchart of the method of use of the system of FIGS. 1A and 1B.

In FIG. 5, a flowchart 501 depicts a method of use of system 101. During use, the bowl is placed in a desired location, wherein the stake is inserted through the elongated opening, as shown with boxes 503, 505. A pet can then be tethered to the stake, thereby ensuring that the bowl remains upright and close enough to the pet for access, as shown with box 507. The bowl is then filled with food and/or water as desired, as shown with box 509.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A pet bowl and tether system, comprising:
    a pet bowl, having:
        a body with a top, a bottom, and one or more side walls forming a cavity for holding food or water, the top having a first thickness, while the bottom having a second thickness, the second thickness is greater than the first thickness and gradually tappers from the second thickness to the first thickness; and
        a central elongated opening extending from the bottom to the top and positioned within a center of the cavity;
        a telescoping stake configured to extend through the central elongated opening and into a ground surface, the telescoping stake having a tethering device to tether a pet leash to, the tethering device is a ring configured to releasably engage with the pet leash;
    wherein the gradual tapering from the second thickness to the first thickness prevents a pet from stepping into the cavity.

2. The system of claim 1, wherein the pet bowl is composed of stainless steel.

3. The system of claim 1, wherein the pet bowl further comprises:
    a divider configured to separate the cavity into two sections.

* * * * *